Feb. 7, 1967  R. HIMELSBAUGH  3,303,327
ELECTRICAL HEATER HAVING A SNAP-IN BASE PLATE
Filed April 10, 1964

INVENTOR
RUDOLPH HIMELSBAUGH

BY Oldham & Oldham

ATTYS.

ns Patent Office 3,303,327
Patented Feb. 7, 1967

3,303,327
ELECTRICAL HEATER HAVING A SNAP-IN
BASE PLATE
Rudolph Himelsbaugh, North Royalty, Ohio, assignor to
Thermal Engineering & Design Company, Akron, Ohio,
a corporation of Ohio
Filed Apr. 10, 1964, Ser. No. 358,821
2 Claims. (Cl. 219—544)

This invention relates to an electrical heater having a snap-in base plate, and more particularly to a compact immersion type electrical heater such as is adapted for use in coffee percolators, electric water heaters, and the like, wherein the heater itself may be mounted by a spring metal snap-in base plate securely engaged in a circumferentially extending internal groove at the base of the metallic case of the heater.

In making coffee, most people desire to make it in automatically controlled electric percolators. These percolators require an immersion type heater element therein and usually they also have a thermostat provided for controlling the flow of electrical power to the heater to control the coffee making operations. One of the main problems with an immersion type heater is that of positioning a stud, or suitable means extending from the heater to attach it to a base plate and/or a desired base, or supporting element. This problem is present because generally the heater is formed in a cylindrical metallic case having one closed end and one open end, with the open end adapted to receive the heating element and to engage a supporting means for the heater.

In prior types of heater constructions, it usually has been necessary to provide some type of a porcelain insulator disc at the lower end of a metal heater can, which is initially open, and then to attach some type of a support stud to the heater means. Such support stud is used to secure the heater to a container means. In many instances, the support stud has been secured to a carrier plate or end disc which is attached to a heater can or case by rolling, or otherwise upsetting the end portion of the heater can to press it radially inwardly against the end disc and force it and the porcelain disc against a shoulder provided in the metal heater can.

Therefore, it is the general object of the present invention to avoid and overcome the foregoing and other difficulties of and objections to prior art practices by the provision of an electric heater wherein a base plate therefor is snapped into position by forcing it into a groove inside the heater casing, and where a mounting stud can be operatively secured to the base plate to attach the heater to a support member.

Another object of the invention is to provide a novel and improved heater means which is of simplified construction and where a special base plate is permanently attached to and resiliently secured in the metal heater can adjacent the lower end thereof.

A further object of the invention is to provide a spring metal base plate for a heater which can be forced into position to attain a permanently tensioned convex concave relationship which provides resiliency to virtually eliminate any possibility of the base plate being loosened or dislodged during heater operation and to maintain the metal heater can and its sealing gasket in resilient compressed engagement with a positioning plate, or wall.

A further object of the invention is to provide a snap-in base plate for a heater wherein the base plate can take a plurality of different shapes, but which all utilize a convex-concave resilient tensioned relationship upon mounting and which engage a metal heater case by portions of, or all of its periphery.

The aforesaid objects of the invention, and other objects which will become apparent as the description proceeds, are achieved by providing in a heater, as one embodiment of the invention, a combination of a metal case having one closed end and an inner circumferentially extending groove parallel and substantially adjacent to an open end of the case, a heating element positioned inside the case, a spring metal plate having a circumference slightly greater than the inside circumference of the case forceably positioned within the case adjacent its open end and with its circumferential edge engaging the groove whereby the inside surface of said plate is forced to a concave shape and the outside surface of said plate is forced to a convex shape, and wire means to supply an electric current extending through said plate and connecting to said heating element.

For a better understanding of the invention, reference should be had to the accompanying drawings, wherein.

Figure 1:
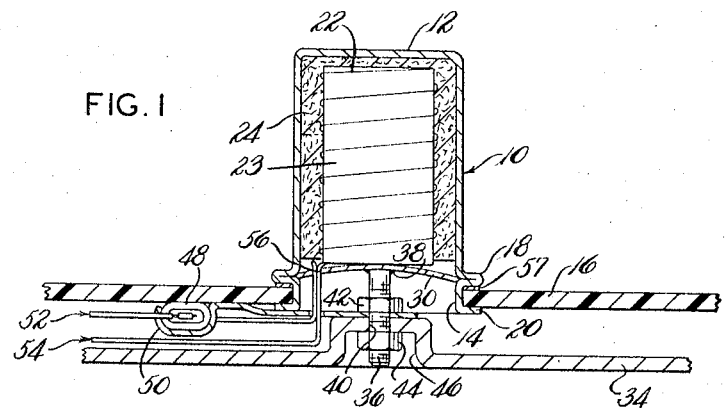
FIG. 1 is a broken away, vertical cross sectional view of one embodiment of the invention utilizing a snap-in base plate with a continuous engaging periphery.
Figure 4:
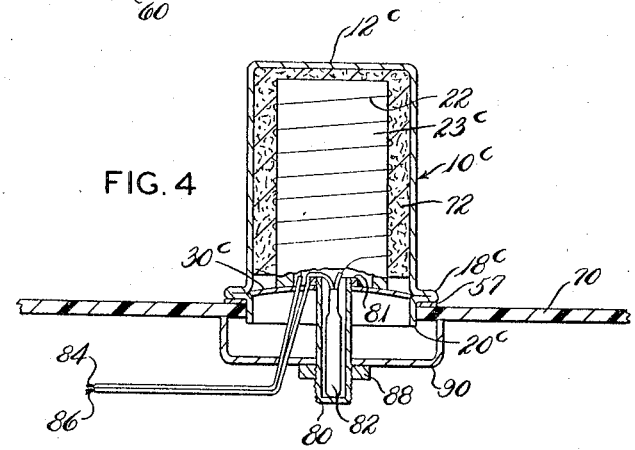
Figure 5:
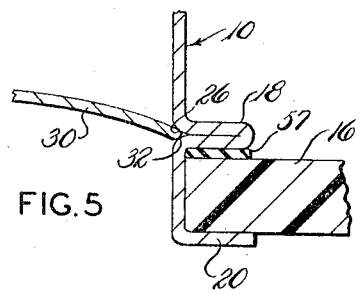

FIG. 4 is a broken away, vertical cross sectional view of another embodiment of the invention wherein the base plate is snapped into position to hold the heating element in operative position within the case, and wherein a hollow stud is operatively mounted to the base plate, which stud contains a thermostat; and FIG. 5 is an enlarged, broken away, vertical cross sectional view showing the relationship of the snap-in base plate of FIG. 1 to the internal circumferentially extending groove in the cylindrical case.

When referring to corresponding members shown in the drawings and referred to in the specification, corresponding numerals are used to facilitate comparison therebetween.

Attention now is particularly directed to the details of the structures shown in the accompanying drawings, and with reference to FIG. 1, the numeral 10 indicates generally a cylindrically shaped metal case, generally made from aluminum or stainless steel, which has a closed end 12 and an open end 14. In order to secure a bottom plate 16, which may be made from metal, or plastic, into engagement with the case 10, the open end is upset into, or otherwise suitably provided with parallel, radially outwardly extending flanges 18 and 20, respectively, which clamp over, or engage the metal bottom plate 16 to form a fluid tight seal between the case 10 and the bottom plate 16. The bottom plate is suitably attached to or formed with the remainder of a container for the beverage heating action.

A heating element 22, carried on a cylindrical porcelain core 23, is operatively positioned within the case 10 through the open end 14 and a ceramic-type sand insulation is poured therearound in a solid state and thereafter hardened in a known manner. The insulation 24 produced securely holds the heating element 22 in proper relation to the case 10 so that substantially equal clearance is provided between all portions of the heating element and the case to obtain substantially uniform heat distribution from the case 10.

As a particularly important feature of the invention, the upset flange 18, as best seen in FIG. 5, is formed from two walls that define a circumferentially extending internal groove 26 in the case. It should be noted that the groove 26 is quite small in both radial and axial directions and it provides a slight indentation in the inner cylindrical side wall of the case 10. A base plate 30, generally made from a flat piece of thin spring steel, is made circular with a slightly greater diameter than the internal diameter of the case 10 at its open end so that it can be forced down into the open end 14 to snap automatically into position in the groove 26. Hence, the outer circumferential edge 32 of the plate engages the groove 26 in the case 10 continuously around the periphery of the plate 30. However, because of the slightly greater diameter of the plate 30 in relation to that of the case, the base plate 30 is forced into convex shape on its inner surface as it is pushed into the case and it is so sized in relation to the groove 26 that when it snaps into position, it retains its convex shape on its inner surface and a concave shape on its outer surface. Hence the base plate 30 is resiliently but tightly engaged with the case 10 and it is particularly difficult to pull out of the case. The base plate 30 may be shaped, in relation to the insulation 24, so as to resiliently engage the end of the core 23 and aid in holding the heating element 22 in position. The invention contemplates that the base plate 30, at its edge 32 thereof, will only extend a short distance into the groove 26 formed by the flange 18 in the case 10, all as clearly shown in FIG. 5.

While the bottom plate 16 forms a fluid tight seal with the case 10, it may be desired to provide a support base 34 for the liquid container. In order to achieve this mounting, a stud 36 is secured to the base plate 30, by appropriate means, such as by welding at 38. The stud 36 extends outwardly from the base plate 30 in substantial axial alignment with the case 10 to pass through a hole 40 in the support base 34. Appropriate nut means 42 and 44, respectively, secure the base plate 34 to the stud 36. It should be noted that the support base 34 contains a raised indented portion 46 so that the mounting to the stud 36 will not extend below the horizontal bottom level of the support base 34. In order to provide thermostatic control to the heating element 22, a thermostat 48 is mounted adjacent, or against the base plate 30 by a support bracket 50, which support bracket 50 is operatively secured to the stud 36 by the nut 42 holding it against the support base 34, as indicated in FIG. 1.

To complete the unit including the heating element 22 of FIG. 1, current carrying wires 52 and 54, respectively, connect thereto and extend to a suitable power source or terminal. Note that the wire 52 connects with the thermostat 48 in series so that the thermostat 48 will control the amount of current carried to the heating element 22. A small hole 56 is provided in the snap-in base plate 30 to allow passage of the wires 52 and 54. The thermostat 48 is placed adjacent the bottom plate 16 in close proximity to the heater case 10 in heat transfer relation to it and the base plate 30 so that the thermostat provides quick and accurate response to the temperatures thereof for good temperature control action.

Figure 2:
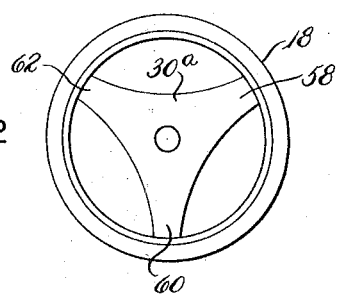
FIG. 2 is a bottom plan view of a cylindrical case with a metal base plate having three equally spaced legs snapped into position at the bottom of the case.
Figure 3:
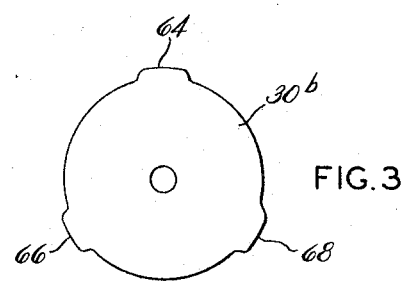
FIG. 3 is a view of a base plate whose circumference is slightly less than the circumference of the cylindrical case, but which base plate has three equally spaced tabs adapted to be snapped into position to engage an internal groove in the case.

FIGS. 2 and 3 illustrate other forms for the base plate 30. Particularly, FIG. 2 illustrates a base plate 30a which has three equally spaced cut away portions so that only three equally spaced legs 58, 60 and 62, are provided to engage the internal groove 26 provided by the upset 18 in the case 10 of FIG. 1. This arrangement is a little easier to snap into place because the legs 58, 60 and 62 bend a little easier than is possible with the flat circular plate 30 of FIG. 1. Also, this embodiment provides the additional feature that the wires to the heating element may be passed through one of the cut away sections.

FIG. 3 illustrates a base plate 30b which has an outer circumference slightly less than the inner circumference of the case 10, but which has a number, such as three equally spaced tabs 64, 66, and 68 which are adapted to snap into the groove 26. These tabs extend far enough radially so that the convex-concave shape, as illustrated in FIG. 1, which is desired to obtain the firm resilient mounting of the base plate, will be achieved in the base plate by its assembly into a metal heater can.

FIG. 4 illustrates another embodiment of the invention wherein an equivalent case 10c may be utilized and the upset flanges 18c and 20c clamp, or otherwise secure the case 10c to a plastic material bottom plate 70, again with a fluid impervious seal, or connection being provided between the heater can and the bottom plate. However, in this instance, a heating coil or element 22 is positioned on a core 23c with its inner end adjacent the closed end 12c of the case 10c. The closed end 12c may be embossed to insure a proper central positioning for the end of the heating element core when it is positioned thereagainst. Suitable insulation means 72 may be utilized to secure the core 23c in the case 10c.

FIG. 4 illustrates that a hollow stud 80 can be removably screwed into the base plate 30c, or be otherwise suitably attached thereto as by engaging a nut 81 welded to the base plate 30c, with a thermostat 82 in this instance operatively mounted in the stud 80. The thermostat 82 is connected in series with one of a pair of wires 84 and 86, respectively, which provide electric current to the heating element 22c. A nut 88 engages the stud 80 to secure a retainer cup 90 against the lower surface of the bottom plate 70 and seal the case thereto. Thus, it is seen that the snap-in base plate 30c firmly positions itself inside the case 10 and operatively positions the hollow stud 80 and the retainer cup 90 in the heater means as operatively assembled. A support base, similar to the support base 34 in FIG. 1, could be operatively affixed to the hollow stud 80, if desired.

It is seen that the objects of the invention have been achieved by providing a snap-in base plate which is made of a spring steel or metal that has the characteristic of spring back from some distortion thereof and which can be used to position means in association with the heater case. The base plate has its outer peripheral edge, or a portion or portions thereof, engaging an internal groove and resiliently resisting any disengagement from such position. Thus, the base plate must be resiliently bent when it is forced into the can 10 and snapped into position so that the inside surface is forced to a convex shape and the outside surface is forced to a concave shape, or the base plate could be preformed to a convex-concave shape prior to its assembly. A mounting stud, being either hollow or solid, may be operatively secured to the base plate, if desired. The resilient characteristic of the base plate allows for expansion and contraction during operation without danger of damage or dislocation to the base plate.

In the practice of the present invention, it will be realized that the novel heater member of the invention can be used in association with any type of a container means. Thus the construction shown in FIG. 1 may be used with a plastic plate 16, and such plastic plate or wall may or may not be formed integrally with the entire container unit, as desired. It should be realized that, when desired, the heater unit of FIG. 1, particularly, could be preformed to the shape shown and the plastic base 16 then could be integrally molded into association with the metal heater unit 10, if desired, to provide a unitary construction or assembly therefrom and wherein a sealed connection is provided between the flange 18 and the upper surface of the base or bottom plate 16. If desired, any suitable type of gasket means can be used in association with the heater flanges 18 and 20, for example, to aid in forming a sealed engagement with the base plate and the container unit. Also, if desired, the can structure 10c could, for example, be welded to a metal base plate, when desired, that is suitably connected to, or associated with the container in which the heater of the invention is assembled, and such weld could be located at any associated surfaces of the metal heater can and the metal base plate used in that embodiment of the invention.

The stud 80 can be of any suitable length and base means for the container may be attached thereto, when desired.

It is a feature of the invention that the plate 30, for example, will be pulled into tighter engagement with the groove 26 by applying tensional forces to the stud 36, as by securing a suitable container base 34 thereto.

In all events, the unit of the invention forms a simplified heater construction, and the open end of the heater can may have suitable support plate means associated therewith for a permanent heater assembly. Naturally any conventional or known type of heater unit or element can be positioned within the heater cans of the invention. In some instances, it may be desirable to have the metal base plates 30, 30a and the like of the invention in direct engagement with the lower end of the resilient or porcelain core on which the resistance member is positioned to aid in positioning such member in the heater assembly.

While in accordance with the patent statutes, at least one best known embodiment of the invention has been illustrated and described in detail, it is to be particularly understood that the invention is not limited thereto or thereby, but that the inventive scope is defined in the appended claims.

What is claimed is:

1. In an electric heater, the combination of
   a cylindrically shaped case having one closed end and an inner circumferentially extending groove formed in the case parallel to and adjacent but spaced from an open end of the case,
   a heating element including a carrier core positioned inside said case,
   insulation means surrounding said heating element and its carrier core and holding them is proper relation to the case, and
   a resilient spring metal plate positioned inside said case with its outside circumferential and peripheral edge continuously engaged with said groove, said metal plate having a greater diameter than the minimum diameter of said groove and being of a convex shape on its inner surface and a concave shape on its outer surface, said metal plate being permanently positioned within said case and being positioned with respect to said heating element and said carrier core so that the metal plate cannot be forced inwardly in an amount sufficient to release the peripheral edges of the metal plate from the groove.

2. In an electric heater, the combination of
   a cylindrically shaped case having one closed end and a circumferentially extending groove formed in the case adjacent an open end thereof,
   a heating element positioned inside the case and including a carrier core,
   insulation means surrounding said heating element, and
   a radially compressed spring metal plate resiliently positioned inside said case with peripheral portions of such metal plate being engaged with said circumferentially extending groove, said plate having a diameter greater than the minimum diameter of said groove, said metal plate being of a convex shape on its inner surface and a concave shape on its outer surface, said inner surface resiliently engaging the heating element carrier core to aid in positioning such carrier core inside said case, said metal plate normally being of planar shape but being bowed axially inwardly when positioned within said case, said metal plate being permanently engaged with said case, all portions of said metal plate in vertical section being smoothly curved in a flat arc extending from edge to edge theerof.

References Cited by the Examiner

UNITED STATES PATENTS

| | | | |
|---|---|---|---|
| 2,654,620 | 10/1953 | Tinnerman | 151—41 X |
| 2,688,995 | 9/1954 | Wagoner. | |
| 2,765,095 | 10/1956 | Dobson et al. | 220—60 |
| 2,982,989 | 5/1961 | Heyer | 85—36 X |
| 3,079,493 | 2/1963 | Goldstein | 151—41 X |
| 3,187,163 | 6/1965 | Wells et al. | 219—441 |
| 3,220,600 | 11/1965 | Wojciechowski | 220—60 |

FOREIGN PATENTS 472,872    4/1951    Canada.

RICHARD M. WOOD, *Primary Examiner.*
C. L. ALBRITTON, *Assistant Examiner.*